UNITED STATES PATENT OFFICE 1,991,323

CELLULOSE ESTER AND PROCESS OF MAKING SAME

Robert Haller, Riehen, near Basel, and Andreas Ruperti, Basel, Switzerland, assignors to the firm of Society of Chemical Industrie in Basle, Basel, Switzerland No Drawing. Application November 4, 1930, Serial No. 493,466. In Switzerland November 14, 1929

6 Claims. (Cl. 260—101)

The present invention relates to the manufacture of new cellulose esters. It comprises the process of making these esters as well as the esters themselves.

In the manufacture of acidyl-cellulose by means of anhydrous organic acids the acidylation is generally performed in the presence of an acid catalyst which more or less hydrolyzes the cellulose substance. This procedure has the disadvantage that it produces a final product in which the cellulose complex is always more or less degraded, which fact has an injurious influence on the quality of the materials manufactured from the acidyl-cellulose, such as artificial threads. Moreover, the acidylation in presence of an acid catalyst follows a course, such that it is not possible to isolate the individual intermediate products before the stage of production of the triacidyl-product.

The acidylation of cellulose without the use of acid catalysts, for instance the acidylation of alkali cellulose or cellulose in presence of a tertiary base with an organic acid anhydride, leads on the other hand to products which, compared with those made with the aid of acid catalysts, have the disadvantage that they have not the solubility required in the solvents used, for instance, in the spinning operation.

According to the present invention cellulose esters are made which unite in themselves the advantages of solubility of the products obtained in acid medium with the tenacity and other good properties of the products made with the aid of basic agents, by first acylating cellulose more or less by means of acetic anhydride or another organic acid anhydride, such as chloroacetic, propionic, butyric, isovaleric acid anhydride, or the like, in presence of basic agents, such as caustic alkalies or organic bases, e. g. cyclic nitrogen containing bases such as pyridine, quinoline etc., the term basic agents including also the salts of weak organic acids with strong bases, such as for example sodium acetate of potassium acetate, and after the acylation treating it with an organic or inorganic esterifying agent, if necessary in presence of substances having a mineral acid reaction, so as to bring it into soluble condition.

It has been observed that in the partial acylation with aid of basic materials there is produced not a superficial but a deeply-seated esterification (which is apparent when one studies the dyed cross section).

The products thus obtained then become soluble even when the further treatment does not produce further esterification. They are distinguished from the products obtained in the purely acid process, as already stated, by the fact that they are derived from a less degraded cellulose, since partially esterified cellulose resists the hydrolyzing attack of the substances having a mineral acid reaction much better than that which is not esterified, and also can be more easily further esterified than unchanged cellulose can be. This is rendered obvious by the fact that the solutions of the new products in suitable solvents have a viscosity which is essentially greater as compared with that of the products obtained in the acid process.

The solubility and the viscosity of the solutions, as well as the other properties of the products can be varied as desired in any direction. This variation can be obtained by varying the preliminary acylation in the first stage and by the choice of the reagents which are to be used in the subsequent treatment (the nature of the acylating agent or of the substances having a mineral acid reaction) and by the selection of other conditions of reaction (duration of the action of the agents, operating at low, medium or high temperature or the like). Thus it is possible to obtain products which are suitable for the manufacture of artificial materials, films, varnishes, lacquers or textiles as may be desired.

It has been found that instead of first isolating the acylated cellulose, such as acetyl cellulose, as is usual in the manufacture of threads (which isolation generally consists in decomposing the acetylated mass of cellulose with water so as to precipitate the acetyl-cellulose, which is then dried, dissolved in a suitable solvent and then spun) the crude solution of the new cellulose ester may be worked up directly by the wet spinning process. For the precipitating bath an aqueous solution of an inorganic or organic salt, a dilute acid or alkaline solution and even pure water may be used. The process has the advantage that precipitation and re-solution are not required and very little degraded product, which is not soluble in the usual solvents and exhibits extraordinarily high viscosity in formic acid, can be worked up. This renders it possible to obtain particularly valuable products in a commercial manner.

The invention is illustrated by the following examples:—

*Example 1*

100 parts of bleached cotton are immersed in 1000 parts of caustic soda solution of 5 per cent.

strength at room temperature for 2 hours and then pressed until its weight amounts to 2-2½ times of the original weight of the cellulose and dried. When dry the whole is introduced, for example, into 500–1000 parts of acetic anhydride and heated for an hour to 95–100° C. The cotton is then removed from the acetic anhydride and pressed and, if necessary, dried after rinsing with water. In this manner there is obtained a partially acetylated material which contains about 1 acetyl-group per 4 $C_6H_{10}O_5$-units. The material thus preliminarily acetylated is esterfied by the usual methods (for example with 300 parts of acetic anhydride, 900 parts of glacial acetic acid and 10 parts of sulfuric acid at room temperature), the reaction occurring considerably more rapidly than is the case with untreated cotton. The reaction can be carried through either in a shorter time or with use of a smaller proportion of catalyst than is necessary in the case of untreated cotton.

Example 2

100 parts of bleached cotton are immersed at room temperature in 1000 parts of caustic soda solution of 15 per cent. strength for 2 hours, then pressed until its weight amounts to 3–4 times of the original weight of the cellulose, and suspended in a drying chamber. When dry the whole is immersed, for example, in 500–1000 parts of acetic anhydride and heated therewith for 1 hour at 95–100° C. The still hot liquid is decanted for further use, the rest of the acetic anhydride is drawn off by suction and the cellulose material is washed with water and dried. In this manner a preliminary acetylation of the material is obtained, in which there are about 1½ acetyl-groups per $C_6H_{10}O_5$-units. This product is not soluble in any organic solvent. The partially acetylated cellulose is now formylated. The reagent for this purpose may consist of 1000 parts of formic acid of 98–100 per cent. strength containing 10 per cent. of zinc chloride. The pre-acetylated yarn is introduced into this mixture; the formylation proceeds at room temperature and without use of any further catalyst, which is remarkable because ordinary cellulose is not deeply formylated by means of formic acid and zinc chloride. After about 10 days there is produced a quite clear strongly viscous solution. This is mixed with ice-water whereby there is obtained as precipitate a snow-white product, the composition of which comes close to that of a tri-ester. This mixed ester is soluble not only in the known solvents for cellulose formate, such as formic acid, pyridine, chlorhydrin, a solution of phenol or the like, but also in nitrobenzene, aniline, aqueous acetone and hot acetic acid. In tetrachlorethane and chloroform it is insoluble. The solution in pyridine, for example, is very viscous and by evaporating the solvent from it there can be obtained a quite clear, strong stable film.

Example 3

The preliminary acetylation is conducted as described in the previous example, except that the action of the acetic anhydride on the alkali cellulose occurs in the presence of 250–500 parts of pyridine. In this manner, under otherwise like conditions, there is produced a more profound preliminary acetylation; the product is insoluble in all organic solvents and corresponds in composition approximately with a cellulose-diacetate.

150 parts of the material thus obtained, which correspond with about 100 parts of the parent material, are immersed for 20 hours at room temperature in 1000 parts of formic acid of 98–100 per cent. strength containing 10–12 parts of hydrochloric acid gas. There is produced a completely clear viscous solution which is mixed with ice-water to precipitate it. The precipitated product contains about 3 acid groups per $C_6H_{10}O_5$-unit and has an enhanced solubility in comparison with the mixed ester of Example 2. Thus it is easily soluble in cold glacial acetic acid and in anhydrous acetone, and also partially soluble in tetrachlorethane when heated. The solution in pyridine is less viscous than that of the product of Example 2, but after evaporation likewise yields a clear, strong and stable film.

If a smaller proportion of hydrochloric acid is used, for example 3 or 1.5 parts, the duration of the reaction is 2 or 4 days respectively, and the products, which have the composition of triesters, are very similar in their solubility and other properties to the product of Example 2. By still longer action of the same formylating operation, the solubility of the mixed ester in anhydrous acetone can in this case also be attained.

Example 4

Cellulose is preliminarily acetylated as described in Example 3 and 15 parts of the product are immersed at room temperature in 100 parts by volume of formic acid of 98–100 per cent. strength, saturated with gaseous hydrochloric acid. The whole is then allowed to stand, whilst simultaneously kneading, until a clear, ropy viscous solution is produced, with formation of a product of which the composition corresponds more or less to that of a mixed tri-ester. The solution can be spun directly in water or in a solution of formic acid. The precipitating bath may also be a salt solution or it may contain such added substances as in the precipitation act favorably in causing the cellulose ester to swell. Other additions, such as a softening agent, may also be added to the precipitating bath or to the spinning solution. If the solution is not directly spun it is desirable to mix with it a quantity of sodium formate equivalent to the hydrochloric acid, in order that the solution may retain its viscosity unchanged.

Example 5

15 parts of a preliminarily acetylated cellulose made as described in Example 3 are introduced into a liquid consisting of 100 parts of formic acid of 85 per cent. strength, saturated with gaseous hydrochloric acid, and 10 parts of zinc chloride. After about 2 hours at room temperature or after 30–40 hours at a temperature of 0° C., complete dissolution has occurred and the solution can be spun. In the spinning a material is obtained similar to that obtained in the preceding example, with the difference that the acid content of the ester exceeds unappreciably that calculated for a di-ester and that the solubility in organic solvents is more limited. Indeed, the product is soluble in formic acid and pyridine but it is insoluble in glacial acetic acid and acetone.

When formic acid of 95 per cent. strength is used the product obtained is an intermediate stage between that made by means of an acid of 85 per cent. strength and that obtained by means of an acid of 100 per cent. strength and contains somewhat more than 2½ acid-groups per $C_6H_{10}O_5$-unit.

Example 6

Cellulose is pretreated with alkali according to the prescription of Example 2 and then treated for 1 hour with 500–1000 parts of boiling acetic anhydride. This partially acetylated material, corresponding approximately with the di-acetate stage, is introduced, after it has been dried, into 1000 parts of nitric acid of 100 per cent. strength. After 16 hours the solution is poured on to ice and the precipitated mixed ester washed until free from acid and dried. The ester is soluble in acetone, pyridine, nitrobenzene, glacial acetic acid. Films or threads can be made from the solutions and these products are less inflammable, even without denitration, than nitrocellulose. The inflammability can be counteracted completely by the addition of such materials as tricresylphosphate.

Example 7

15 parts of the preliminarily acetylated material made by the prescription of Example 2 are introduced into a cooled mixture of 100 parts of glacial acetic acid and 100 parts of nitric acid of 96–100 per cent. strength and left therein at room temperature. There is produced a clear solution which after 48 hours is mixed with ice-water to produce a precipitate constituting a product easily soluble in pyridine and yielding a very strong and flexible film. The inflammability is similar to that of acetyl-cellulose. In acetone the product is insoluble.

If the acylating mixture is allowed to act for a longer period and the precipitation is postponed for example for 4 days, the product obtained is soluble in acetone and also yields a good film.

In the preceding examples the starting material has been alkali cellulose, but one can also work without alkali by washing the alkali cellulose first with water to remove the alkali completely, and then acylating the swelled cellulose in presence of pyridine. The swelled cellulose itself can also be produced with aid of salts, such as for example rhodanides, or with acids. The swelled cellulose can also be impregnated with acetates of alkalies, preferably potassium acetate, and then treated with the anhydrides of organic acids, cf. British Patent No. 353,978.

Example 8

100 parts of insoluble chloracetylcellulose, obtainable as described in Example 9 of British Patent No. 353,978 are immersed in 5000 parts of a mixture of equal parts of glacial acetic acid and nitric acid of 97–100 per cent. strength and are allowed to remain until complete dissolution has occurred, and the ester precipitated from a test portion by addition of water dissolves smoothly in acetone. If the operation is conducted at the room temperature this end and condition will be attained in the course of 6–10 days. By increasing the temperature or by using a larger proportion of nitric acid, the solubility in acetone may be attained in a much shorter period. The solution is now run gradually, while stirring, into much ice-water, whereby the cellulose ester is precipitated in the form of a white fibrous product. This is filtered and washed first with cold water and then with hot water until free from acid. An analysis of this product re-precipitated from acetone shows the presence of 16 per cent. of chlorine and 2.9 per cent. of nitrogen. The product is insoluble in hydrocarbons, alcohol, ether and chloroform; it dissolves in hot glacial acetic acid and formic acid. In pyridine the product at first dissolves but the solution soon gelatinizes. The ester is freely soluble in cold acetone to a viscous solution which, when evaporated, leaves transparent, solid and elastic fibers. The latter have the same properties relative to dyestuffs as those of the original chloracetyl-cellulose.

Example 9

100 parts of the insoluble chloracetyl-cellulose obtainable as described in Example 9 of British Patent No. 353,978 are immersed in 1000 parts of formic acid of 98–100 per cent. strength containing 10 parts of hydrochloric acid and 100 parts of zinc chloride, and are allowed to remain therein until acetone solubility has been attained (as may be determined by testing a sample).

In contrast with the nitric acid treatment the formic acid mixture does not yield a complete solution when acetone solubility has been attained, since even the acetone soluble cellulose derivative of the first paragraph of the example is only slightly soluble in cold formic acid. When acetone solubility is attained the mass is mixed with water and the cellulose ester washed free from acid. The product has properties completely analogous both in respect of dyeing and in respect of solubility in organic solvents to those of the product treated with nitric acid. Its acetone solution yields films of very good properties.

Instead of cotton any other cellulose product, such as inter alia wood pulp, linters, sulfite cellulose, etc., or other products consisting mainly of cellulose, may be used.

As substances having a mineral acid reaction, there may be used instead of hydrochloric acid, sulfuric acid or zinc chloride, other products such as halogens, acid halides, organic sulfonic acids, acid anhydrides or the like.

The substances having a mineral acid reaction may themselves have an esterifying action. This is the case, for example, with nitric acid. The esterifying agents may be used in a gaseous condition; for example, there may be used a current of air charged with nitric acid vapor.

What we claim is:—

1. A process for the production of mixed cellulose esters in two steps, wherein in the first step alkali cellulose is esterified with anhydrides of such fatty acids which have 2 to 5 carbon atoms, and in the second step the cellulose ester obtained according to the first step is converted into soluble products by further treatment with formic acid in presence of a substance having a mineral acid reaction.

2. A process for the production of mixed cellulose esters in two steps, wherein in the first step potassium cellulose is esterified with anhydrides of such fatty acids which have 2 to 5 carbon atoms, and in the second step the cellulose ester obtained according to the first step is converted into soluble products by further treatment with formic acid in presence of a substance having a mineral acid reaction.

3. A process for the production of mixed cellulose esters in two steps, wherein in the first step potassium cellulose is esterified with acetic anhydride, and in the second step the cellulose ester obtained according to the first step is converted into soluble products by further treatment with formic acid in presence of a substance having a mineral acid reaction.

4. As new cellulose derivatives the mixed cellulose esters obtained by the esterification in two steps, wherein in the first step alkali cellulose is esterified with anhydrides of such fatty acids which have 2 to 5 carbon atoms, and in the second step the cellulose ester obtained according to the first step is converted into soluble products by further treatment with formic acid in presence of a substance having a mineral acid reaction, which products are colorless substances which are distinguished by an insignificant degradation of the cellulosic substance.

5. As new cellulose derivatives the mixed cellulose esters obtained by the esterification in two steps, wherein in the first step potassium cellulose is esterified with anhydrides of such fatty acids which have 2 to 5 carbon atoms, and in the second step the cellulose ester obtained according to the first step is converted into soluble products by further treatment with formic acid in presence of a substance having a mineral acid reaction, which products are colorless substances which are distinguished by an insignificant degradation of the cellulosic substance.

6. As new cellulose derivatives the mixed cellulose esters obtained by the esterification in two steps, wherein in the first step potassium cellulose is esterified with acetic anhydride, and in the second step the cellulose ester obtained according to the first step is converted into soluble products by further treatment with formic acid in presence of a substance having a mineral acid reaction, which products are colorless substances which are distinguished by an insignificant degradation of the cellulosic substance.

ROBERT HALLER.
ANDREAS RUPERTI.